No. 895,396. PATENTED AUG. 4, 1908.
D. K. ALLISON.
LUBRICATING DEVICE.
APPLICATION FILED JUNE 6, 1906.
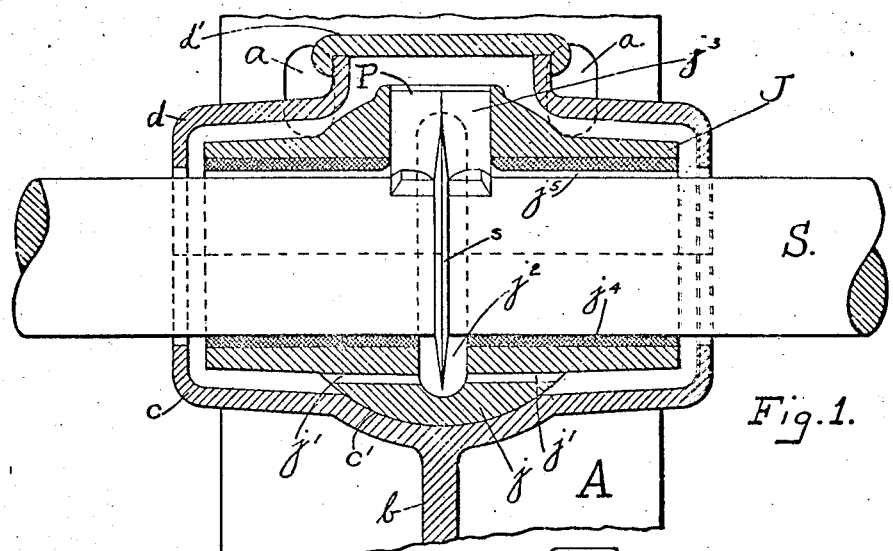
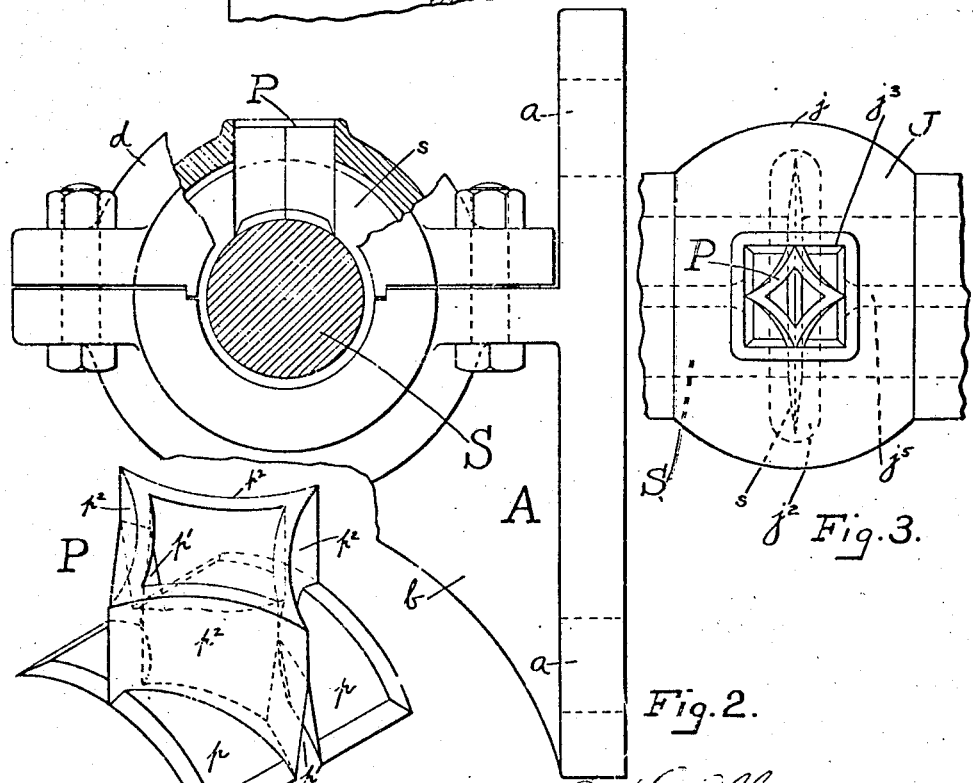
WITNESSES:
Frank E. Dennett
Ella Brickell
D. K. Allison INVENTOR
BY
ATTORNEY.

UNITED STATES PATENT OFFICE.

DANIEL K. ALLISON, OF MILWAUKEE, WISCONSIN, ASSIGNOR TO ALLIS-CHALMERS COMPANY, OF MILWAUKEE, WISCONSIN, A CORPORATION OF NEW JERSEY.

LUBRICATING DEVICE.

No. 895,396.　　　Specification of Letters Patent.　　　Patented Aug. 4, 1908.

Application filed June 6, 1906. Serial No. 320,369.

*To all whom it may concern:*

Be it known that I, DANIEL K. ALLISON, a citizen of the United States, residing at Milwaukee, in the county of Milwaukee and State of Wisconsin, have invented a certain new and useful Lubricating Device, of which the following is a specification.

This invention relates to lubricating devices and comprises generally, the combination with a shaft and journal box, of means for supplying a lubricant to the shaft.

In the accompanying drawings which form a part of this specification and on which similar reference characters are used to indicate the same elements in each of the several views,—Figure 1 is a fragmentary elevation of devices embodying this invention, a part thereof being shown in section. Fig. 2 is an elevation taken at right angles to the length of the shaft, a part of the casing being broken away. Fig. 3 is a plan view of the journal box. Fig. 4 is a perspective view of the lubricant deflecting and directing device.

In the drawings, S represents the shaft; J represents a journal box within which the shaft S is seated; A represents a support for the journal box and shaft. This support A is shown as a form of bracket provided with apertures $a$, $a$, by which it may be attached to a part of a machine or similar object, and is provided with a strengthening rib $b$. The strengthening rib $b$ is expanded at its upper part to form an enlarged box or receptacle $c$, which is open at the top and is provided with a cover $d$ which may be secured thereto by bolts, as shown.

Contained within the box or receptacle $c$, and preferably retained in a spherically formed bearing seat therein, is the journal box J. This journal box is provided with an enlargement $j$ which is adapted to be seated in the spherical surface $c'$ formed in the box or receptacle $c$.

The purpose of the spherically formed bearing surfaces is to allow of angular movement between the shaft S and the support A while the shaft and journal box will be securely retained in position even though the shaft and the supporting member become disarranged from their proper alinement.

Advantage is taken of the enlargement $j$ of the journal box J as affording a convenient means for supplying a lubricant to the shaft.

In the lower part of this enlargement are formed apertures $j'$ through which communication is afforded between the cavity $j^2$ formed in the interior of the journal box and the interior of the box $c$. The upper part of the journal box is provided with an aperture $j^3$ and the interior of the journal box may be babbitted, as shown at $j^4$.

The journal box is provided with a groove $j^5$ extending lengthwise thereof and parallel with the shaft, and this groove is intersected by the aperture $j^3$ referred to above.

Upon the shaft S and located within the cavity $j^2$ of the journal box, is a ring or protuberance $s$, and this ring is intended to dip into a lubricant contained in the journal box and casing $c$, in order to throw the same around the shaft when the shaft is rotated.

In order to deflect and direct the lubricant lengthwise of the shaft so that the entire length of the shaft inclosed within the journal box will be lubricated, use is made of a scraping, deflecting and directing member P, which may be formed as a part of the journal box but which is preferably formed as a separate member which is loosely seated within the aperture $j^3$ of the journal box resting upon the shaft S and straddling the ring $s$. This member P, as shown, comprises beveled portions $p$ which are adapted to rest upon the shaft and curved upright portions $p^2$, notches $p'$ being provided to receive the ring $s$. The cover $d$ of the box $c$ is provided with the removable cap $d'$ through which the lubricant may be introduced into the box $c$.

The operation of the device is as follows: The lubricant contained in the lower part of the box $c$ will pass through the apertures $j'$ into the cavity $j^2$ of the journal box; and as the shaft S is rotated, the ring $s$ dipping into the lubricant, will impart motion to a part of the lubricant in the direction of rotation of the shaft. The lubricant thus being carried along by the shaft and ring $s$ will encounter the member P by which it will be deflected and directed into the groove $j^5$.

It will be noticed by reference to Fig. 3 that the member P being made symmetrical on both sides of the axis of the shaft as there shown, is reversible and no particular care need be exercised in inserting it into the aperture $j^3$. It will also be noticed that said member is adapted to operate in whichever direction the shaft is revolved, and it will be further noticed that in whichever direction the shaft be revolved, said member is so arranged as to deflect and direct the lubricant into the groove $j^3$. This feature of positively deflecting and directing the lubricant is of especial importance in case the journal box is mounted as shown in Fig. 1; for, if the journal box be mounted as shown in said Fig. 1, and the shaft be thrown out of alinement vertically, a part of the lubricant must be forced upwardly against the force of gravity, and under such circumstances the kinetic energy of the lubricant to which motion has been imparted by the shaft and ring $s$ will be sufficient to carry it to the desired places, the function of the member P being merely to deflect and direct said lubricant to such places.

What is claimed and desired to be secured by Letters Patent, is:—

1. The combination with the supporting member A provided with the enlargement $c$, of the cover $d$, the journal box J movably supported by said supporting member A, the shaft S provided with the ring $s$, and the deflecting and directing member P, the journal box being provided with the apertures $j'$ and $j^2$.

2. The combination with the supporting member A provided with the enlargement $c$, of the cover $d$, the journal box J movably supported by said supporting member A, the shaft S provided with the ring $s$, and the deflecting and directing member P, the journal box being provided with the apertures $j'$ $j^2$, and the groove $j^3$.

In testimony whereof, I affix my signature in the presence of two witnesses.

DANIEL K. ALLISON.

Witnesses:
G. F. DE WEIN,
FRANK E. DENNETT.